United States Patent
Powell et al.

(10) Patent No.: US 6,283,908 B1
(45) Date of Patent: Sep. 4, 2001

(54) VITRIFICATION OF WASTE WITH CONITNUOUS FILLING AND SEQUENTIAL MELTING

(75) Inventors: James R. Powell, Shoreham; Morris Reich, Kew Gardens Hills, both of NY (US)

(73) Assignee: Radioactive Isolation Consortium, LLC, Falls Church, VA (US)

( * ) Notice: Subject to any disclaimer, the term of this patent is extended or adjusted under 35 U.S.C. 154(b) by 0 days.

(21) Appl. No.: 09/564,774

(22) Filed: May 4, 2000

(51) Int. Cl.$^7$ .................................... B09B 3/00
(52) U.S. Cl. ........................................... 588/252
(58) Field of Search ................ 588/11, 252; 65/134.8

(56) References Cited

U.S. PATENT DOCUMENTS

| | | | |
|---|---|---|---|
| H152 | * 11/1986 | Lampe ................................ | 588/11 |
| 4,221,680 | * 9/1980 | Hardwick et al. ................. | 252/301.1 |
| 4,404,129 | * 9/1983 | Penberthy et al. ................. | 252/629 |
| 4,581,163 | * 4/1986 | Meinnger et al. ................. | 252/633 |
| 5,324,485 | * 6/1994 | White ................................. | 588/19 |
| 5,678,237 | * 10/1997 | Powell et al. ...................... | 588/11 |
| 5,947,887 | * 9/1999 | White et al. ....................... | 588/252 |

* cited by examiner

Primary Examiner—David Bagnell
Assistant Examiner—John Kreck
(74) Attorney, Agent, or Firm—Louis Ventre, Jr.

(57) ABSTRACT

A method of filling a canister with vitrified waste starting with a waste, such as high-level radioactive waste, that is cooler than its melting point. Waste is added incrementally to a canister forming a column of waste capable of being separated into an upper zone and a lower zone. The minimum height of the column is defined such that the waste in the lower zone can be dried and melted while maintaining the waste in the upper zone below its melting point. The maximum height of the column is such that the upper zone remains porous enough to permit evolved gases from the lower zone to flow through the upper zone and out of the canister. Heat is applied to the waste in the lower zone to first dry then to raise and maintain its temperature to a target temperature above the melting point of the waste. Then the heat is applied to a new lower zone above the melted waste and the process of adding, drying and melting the waste continues upward in the canister until the entire canister is filled and the entire contents are melted and maintained at the target temperature for the desired period. Cooling of the melted waste takes place incrementally from the bottom of the canister to the top, or across the entire canister surface area, forming a vitrified product.

6 Claims, 1 Drawing Sheet

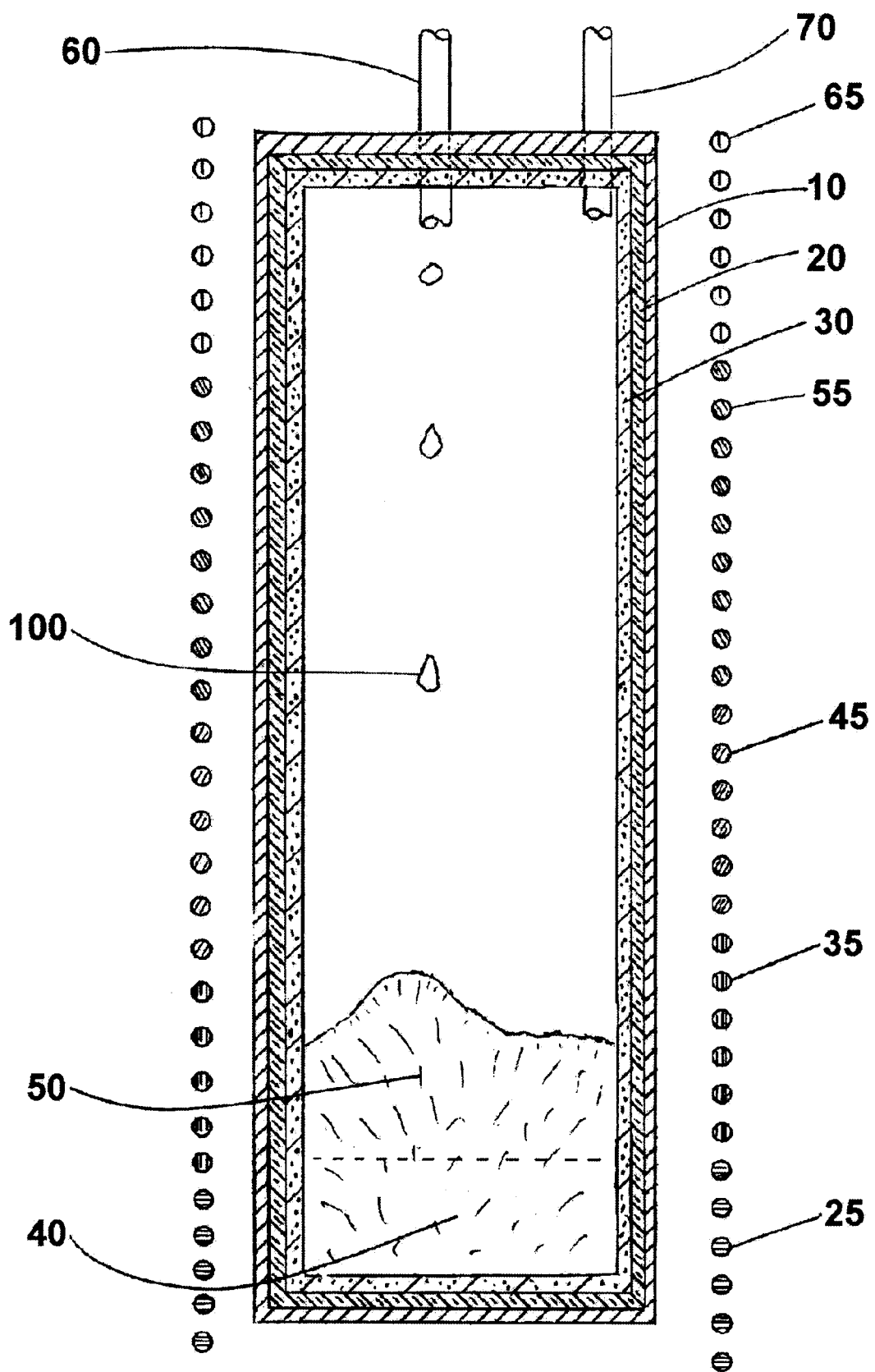

VITRIFICATION OF WASTE WITH CONITNUOUS FILLING AND SEQUENTIAL MELTING

CROSS-REFERENCE TO RELATED APPLICATIONS

U.S. Pat. No. 5,678,237, entitled Advanced Vitrification System, describes a canister and related method of in-situ vitrification of waste materials in a disposable canister.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract DE-AC26-98FT40450 awarded by the United States Department of Energy.

BACKGROUND OF THE INVENTION

The Advanced Vitrification System Canister Filling Process is a method for filling a canister with vitrified waste and glass making frit (hereinafter referred to as "waste") starting with a waste that is cooler than its melting point. The present invention relates generally to a process for vitrifying waste, such as nuclear waste, in a disposable canister.

The disclosure of U.S. Pat. No. 5,678,237, which describes a canister and related method of in-situ vitrification of waste materials in a disposable canister, is incorporated herein by reference. The referenced disposable canister has an inner container and an outer container. The outer container serves as the traditional disposal container typically made of steel, which is insulated from an inner container, typically of made of graphite, by a layer of insulating material. The inner container serves as a crucible to melt a waste, contain the waste in its molten state, and serve as the disposal container for the vitrified product.

In the referenced patent, waste is added to the inner container and heated until it is melted. Then the waste is allowed to cool into a solid vitrified product. This process permits making a vitrified product occupying about 60% of the available container volume, due to the fact that the waste reduces in volume once it is melted. Increasing the fill volume of the container would permit minimizing the number of canisters required to dispose of a given volume of waste. Since reducing the number of canisters reduces the disposal costs, it is highly desirable to increase the fill volume.

Accordingly, this invention is a process for filling the container to a much higher level, that is, approaching 100% of the available volume.

BRIEF SUMMARY OF THE INVENTION

The Advanced Vitrification System Canister Filling Process is a method of filling a canister with vitrified waste starting with a waste that is cooler than its melting point. The invention may be used with any waste requiring isolation from the biosphere, such as high-level radioactive waste, low-level radioactive waste, toxic wastes, hazardous waste and hazardous and radioactive mixed waste. In the preferred embodiment, the process is utilized in a disposable canister consisting of outer and inner containers with thermal insulation therebetween. In its broadest potential, the process is utilized in a disposable canister consisting of a single container made of a material capable of being heated and serving and as a crucible for the melt. In the preferred embodiment, the method of filling a canister with vitrified waste starts with a waste that is cooler than its melting point. In the preferred embodiment, this waste is added incrementally, and more or less continuously, to a canister forming a column of waste capable of being separated into an upper zone and a lower zone. In its broadest use, the waste can be added discontinuously at any rate. The minimum height of the column is defined such that the waste in the lower zone can be dried and melted while maintaining the waste in the upper zone below its melting point. The maximum height of the column is such that the upper zone remains porous enough to permit evolved gases from the lower zone to flow through the upper zone and out of the canister. Heat is applied to the waste in the lower zone to first dry then to raise and maintain its temperature to a target temperature above the melting point of the waste. Then the heat is applied to a new lower zone above the melted waste and the process of adding, drying and melting the waste continues upward in the canister until the entire canister is filled and the entire contents are melted and maintained at the target temperature for the desired period. In the preferred embodiment, cooling of the melted waste takes place from the bottom of the canister to the top forming a vitrified product. In its broadest potential, cooling of the melted waste can take place over the entire surface of the canister.

BRIEF DESCRIPTION OF THE DRAWING

The invention, in accordance with preferred and exemplary embodiments, together with further objects and advantages thereof, is more particularly described in the following detailed description taken in conjunction with the accompanying drawing in which:

The drawing shows a waste canister having inner container (30) and an outer container (10) with insulation (20) therebetween. Unmelted waste (100) is shown dropping into a bottom segment of the available canister volume from a feed pipe (60) and filling the bottom segment. The waste in the bottom segment of the canister is divided into a lower zone (40) of the waste and an upper zone (50) of waste. The upper zone is of such depth as to permit the flow of drying and melt gases from the lower zone (40) through the upper zone and thence out of the canister via an exhaust pipe (70). The lower zone (40) is heated by passing current through a bottom segment of coils (25) surrounding the waste (40) in the lower zone and inductively heating the inner container (30), typically made of graphite. Conduction of heat from the inner container walls into the lower zone (40) of the waste mass heats the wastes. As the lower zone (40) melts, it decreases in volume. Colder wastes (100) are added to the upper zone either in a continuous fashion, or in a discontinuous fashion as may be convenient to the maintenance of a porous upper zone. Once the waste in the lower zone is above its melting temperature for the period of time needed to ensure a quality product, then new upper and lower zones of unmelted waste are defined immediately above the melted waste and the new lower zone is heated by activating the next higher segment of coils (35) adjacent to the new lower zone. In this fashion, waste in progressively higher lower zones are sequentially melted by activating segments of the coils adjacent to each progressively higher lower zone, e.g. (45) and (55), until only an upper zone remains. When only an upper zone remains, the uppermost coil segment (65) heats the upper zone and completes the filling and melting processes. Coil segments are only illustrative and maximum flexibility should be maintained to energize as many segments as may be required to sequentially heat lower zones maintaining porous upper zones.

DETAILED DESCRIPTION OF THE INVENTION

The invention involves four fundamental processes: progressive melting, progressive drying, progressive filling, and progressive cooling. These are defined as follows:

Progressive Melting. A lower zone and an upper zone of waste in the canister is defined from a column of waste within the canister such that gases evolved by the heating of the lower zone will flow through the upper zone and thence out of the module. The overall height of the column of the waste may be a fraction of the canister length or it may be the full height of the canister, depending upon the properties of the waste. The heating process is conducted at a rate that will permit gases released by drying and melting the waste to flow through the upper zone and out of the canister. Heating continues until a target temperature above the melt temperature of the waste has been attained and maintained for the period required to produce the quality of vitrified product desired. Waste is added to the top of the waste column during the heating process either sporadically as the volume shrinks due to the melting process, or continuously at a rate that does not compromise the ability of the upper zone to permit evolution of the drying and melt gases. Once the initial lower zone of waste is melted, a new lower zone of unmelted waste is defined immediately above the melted lower zone in the same manner as was done for the initial lower zone. Heating is then applied to the new lower zone of waste, and this process is repeated until the module is filled and a final upper zone of waste is melted.

Progressive drying. A lower zone and an upper zone of waste in the canister is defined from a column of waste within the canister such that gases evolved in the heating of the lower zone will flow through the upper zone and thence out of the module. This overall height of the column of the wastes defined into such lower and upper zones may be partially up the canister length or it may be the full height of the canister, depending upon the properties of the waste. The drying process begins by heating the lower zone at a rate that will permit the flow of drying gases through the upper zone and out of the canister. Heating continues until a target temperature below the melt temperature of the waste has been attained and maintained for the period required to produce the quality of dryness desired. Waste is added to the top of the waste column during the heating process either sporadically as the volume shrinks, or continuously at a rate that does not compromise the ability of the upper zone to permit evolution of the drying gases. Once the initial lower zone of waste is dried, a new lower zone of undried waste is defined immediately above the dried lower zone in the same manner as was done for the initial lower zone. Heating is then applied to the new lower zone of waste, and this process is repeated until the module is filled to a height that a final upper zone of waste is dried.

Progressive Filling. This process refers to filling a vertical right cylindrical canister with waste such that the volume of the canister will almost entirely be filled with vitrified waste upon conclusion of the progressive cooling process. The waste can be added to the canister, usually from the top, in a continuous manner until the canister is full. The waste can also be added discontinuously, that is, a quantity of waste can be added at various times not necessarily in a continuous fashion. In both instances waste is added in such a manner as to match the requirements of the progressive drying process. Essentially the rate of addition of waste to the canister must be sufficient so as to maintain a lower zone and an upper zone of waste such that the upper zone remains gas permeable to permit evolution of gases from the drying process.

Progressive Cooling. This process refers to cooling and solidifying the melted waste from one end of the canister to the other end, usually from the bottom of the canister to the top. It can begin after the entire canister of waste has been melted. It can also begin when a segment of the waste of sufficient size has been melted such that cooling at one end of the melted segment can begin without interfering with the melting process at or beyond the other end of the segment.

EXAMPLE 1

This example illustrates the preferred embodiment of the process used to fill a canister with vitrified wastes.

Concurrent Fill and Progressive Melting Process. Progressive filling is initiated in a canister and continues until the canister is filled to the desired level. The empty canister can either be at ambient temperature or it can be heated to a temperature below the melt point of the waste. While the canister is being filled, progressive melting is initiated and concluded when the entire mass of waste is melted. Then, progressive cooling begins and is concluded when the vitrified waste has cooled to ambient temperature.

EXAMPLE 2

This example illustrates the first alternative embodiment of the process used to fill a canister with vitrified wastes.

Concurrent Fill, Progressive Melting and Progressive Cooling Process. Progressive filling is initiated in a canister and continues until the canister is filled to the desired level. The empty canister can either be at ambient temperature or it can be heated to a temperature below the melt point of the waste. While the canister is being filled, progressive melting begins. Once a bottom segment in the canister equaling about 25% of the available volume has been heated to a target temperature above the melting temperature of the waste, progressive cooling at the lowest level of the bottom segment is initiated. Progressive melting and progressive cooling continue rising up from the bottom of the canister at about the same rate until the final upper zone of waste is melted to the target temperature. Then, progressive melting stops and progressive cooling continues until the entire mass of waste is at ambient temperature.

EXAMPLE 3

This example illustrates the second alternative embodiment of the process used to fill a canister with vitrified wastes.

Concurrent Fill, Progressive Drying and Progressive Melting Process. Progressive filling is initiated in a canister and continues until the canister is filled to the desired level of melted waste. The empty canister can either be at ambient temperature or it can be heated to a temperature below the melt point of the waste. While the canister is being filled, progressive drying begins and is concluded when the canister is filled to a height that a final upper zone of waste can be safely dried. Once the filled volume has been dried, progressive melting begins. At the conclusion of progressive melting, progressive cooling continues until the entire mass of waste is at ambient temperature.

EXAMPLE 4

This example illustrates the third alternative embodiment of the process used to fill a canister with vitrified wastes.

Sequential Fill and Dry Process. Progressive filling is initiated in a canister and continues until the canister is filled to the desired level. The empty canister can either be at ambient temperature or it can be heated to a temperature below the melt point of the waste. While the canister is being filled, progressive drying begins and is concluded when the canister is filled to a height that a final upper zone of waste can be safely dried. Once the filled volume has been dried, progressive melting begins. Once a bottom segment in the canister equaling about 25% of the available volume has been heated to a target temperature above the melting temperature of the waste, progressive cooling at the lowest level of the bottom segment is initiated. Progressive melting and progressive cooling continue rising up from the bottom of the canister at about the same rate until a final upper zone of waste is melted to the target temperature and held at that temperature for the required period. Then, progressive melting stops and progressive cooling continues until the entire mass of waste is at ambient temperature.

We claim:

1. A process for vitrifying waste comprising,
   a. adding unmelted waste to a disposable canister forming a column of waste capable of being separated into an upper zone and a lower zone, and while adding waste,
      i. heating the lower zone of the waste in the canister to achieve a melted waste in the lower zone at a target temperature above the melting point temperature of the waste while maintaining an unmelted waste in the upper zone;
      ii. maintaining the target temperature for a period of time determined to produce a quality vitrified product;
      iii. thence heating a new lower zone of the waste located above the melted waste to achieve a melted waste at a target temperature above the melting point temperature of the waste in the new lower zone while maintaining an unmelted waste in a new upper zone;
      iv. thence repeating steps ii. and iii. until the canister is filled to the desired height and while doing so and prior to filling the canister to the desired height initiating cooling of one or more of the lower zones such that the temperature of such zones is below the melting point of the waste in those zones;
   b. thence heating a final upper zone to achieve a melted waste;
   c. thence cooling the waste to ambient temperature.

2. The process of claim 1 in which the canister has an inner container and an outer container with insulation therebetween.

3. A process for vitrifying waste comprising,
   a. adding unmelted waste to a disposable canister forming a column of waste capable of being separated into an upper zone and a lower zone, and while adding waste,
      i. heating the segment of the canister wall adjacent to the lower zone of the waste in the canister to achieve a melted waste in the lower zone at a target temperature above the melting point temperature of the waste while maintaining an unmelted waste in the upper zone;
      ii. maintaining the target temperature for a period of time determined to produce a quality vitrified product;
      iii. thence heating the segment of the canister wall adjacent to a new lower zone of the waste located above the melted waste to achieve a melted waste at a target temperature above the melting point temperature of the waste in the new lower zone while maintaining an unmelted waste in a new upper zone;
      iv. thence repeating steps ii. and iii. until the canister is filled to the desired height;
   b. thence heating the segment of the canister wall adjacent to a final upper zone to achieve a melted waste;
   c. thence cooling the waste to ambient temperature.

4. The process of claim 3 in which each of the lower zones is maintained above the melting temperature for the waste until after the final upper zone has reached the temperature.

5. The process of claim 3 in which one or more of the melted lower zones is cooled below the melting point temperature for the waste in those zones prior to reaching and maintaining the target temperature in the final upper zone.

6. The process of claim 3 in which the cooling in step 7c. of the melted waste takes place incrementally from the bottom of the canister to the top.

* * * * *